Oct. 4, 1966    G. NATTA ET AL    3,277,067
POLYMERS HAVING A STEREOREGULAR STRUCTURE OBTAINED FROM
COMPOUNDS CONTAINING CONJUGATED DOUBLE BONDS
AND PROCESS FOR PREPARING SAME
Filed April 7, 1961

INVENTORS
GIULIO NATTA
MARIO FARINA
MARIO DONATI
BY

ATTORNEY.

United States Patent Office 3,277,067
Patented Oct. 4, 1966

3,277,067
POLYMERS HAVING A STEREOREGULAR STRUCTURE OBTAINED FROM COMPOUNDS CONTAINING CONJUGATED DOUBLE BONDS AND PROCESS FOR PREPARING SAME
Giulio Natta, Mario Farina, and Mario Donati, all of Milan, Italy, assignors to Montecatini Societa Generale per l'Industria Mineraria e Chimica, Milan, Italy, a corporation of Italy
Filed Apr. 7, 1961, Ser. No. 101,475
Claims priority, application Italy, Aug. 1, 1960, 13,570/60
32 Claims. (Cl. 260—80)

The present invention relates to polymers having a highly regular structure, obtained from unsaturated esters and acids containing at least two double unsaturated conjugated bonds, and having the general Formula 1

$$R^I\text{—CH}=\text{CH—CH}=\text{CH—COOR}^{II} \quad (1)$$

wherein $R^I$ and $R^{II}$, are equal or different from each other and may be an hydrogen atom or alkyl, cycloalkyl, aryl, or aralkyl groups, either substituted or unsubstituted, having 1–16 carbon atoms.

The present invention further relates to salts of polyacids which have been obtained by saponifying the above mentioned polymers.

The invention also includes a process for preparing these polymers.

The above mentioned monomers may be referred to as butadiene-1-carboxyl acids or esters, according to the following formula:

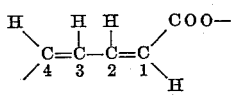

As can be seen, the variety of stereoregular structures which are theoretically obtainable from these monomers are very numerous because of the possible different substitutions in the 1 and 4 positions and in the two unsaturated bonds.

In describing these stereoregular structures, we will use, when possible, the nomenclature indicated in publications such as, G. Natta, M. Farina, and M. Peraldo, Chimica e Industria 42, 255 (1960).

The polymerization of these monomers can occur, for instance, either prevailingly or exclusively in a 1–2, 3–4, or a 1–4 manner, or in other ways. With regard to these first three polymerizations there is also the possibility of both cis- and trans-configurations of the double bond in the main chain or in the side-chains. There also may exist steric arrangements of the isotactic or syndiotactic type for each of the two asymmetric carbon atoms or for the single asymmetric carbon atom in the case where $R^I$ is H.

Upon considering this variety of possible stereoisomers, it would appear impossible, at least very difficult, to obtain polymers showing a regular structure, resulting from a single isomeric form.

We have surprisingly found that by working under the conditions hereinafter described, polymers are obtained which have such a very regular steric structure that they show a very high crystallinity under the X-ray examination.

Upon using various pure stereoisomers of the monomers of general Formula 1, we have produced polymers possessing several different structures.

It is known that four stereoisomers are possible from compounds having two conjugated double bonds with two different substituents in the 1 and 4 positions.

Thus, sorbic acid (or 4-methyl-1-carboxy-butadiene) having the formula; $CH_3\text{—CH}=\text{CH—CH}=\text{CH—COOH}$, in the generally obtained form has a trans-trans-configuration; but the cis-trans, trans-cis and the cis-cis isomers are also known in the specialized literature.

When all the substituents in the 4-position are equal, there are only two stereoisomers of the monomers, the cis-stereoisomer and the trans-stereoisomer.

It is an object of the present invention to provide a process for obtaining polymers possessing the above indicated structures with the aid of anionic type catalysts, more particularly, compounds of a metal belonging to the I group of the Periodic Table.

Among these catalytic compounds the most active are the lithium compounds, particularly the lithium alkyls, lithium aryls, lithium amides, and lithium ketyles. Sodium alkyls are also active.

According to the process of the present invention, in general, anhydrous solvents or mixtures thereof are employed. These solvents may be inert, such as, aliphatic or aromatic hydrocarbons, or may possess basic characteristics according to the Lewis concept, for example, ethers such as diethylether, diethyleneglycol diethylether, tetrahydrofurane, anisole, etc.; or tertiary amines such as pyridine, tributylamine; or tertiary phosphines such as triphenylphosphine.

The above mentioned basic compounds are able to form complex compounds with the catalytic system.

Analogous properties are also exhibited by the so-called onium salts having the following formula:

$$[R_nA]_mX_p$$

wherein R is a hydrocarbon radical; A is an element taken from the group consisting of N, P and S; X is an anion such as halogen or sulphur containing anions, etc.; and $m$ and $n$ are whole numbers.

The lithium alkyl compounds react in hydrocarbon solvents such as, for example, toluene with $[N(C_4H_9)_4]I$ yielding two liquid layers which both catalytically promote the polymerization of the monomers of general Formula 1.

The amount of catalyst which should be present in the reaction mixture in order to obtain a rapid polymerization rate may vary within wide limits.

Generally, the polymerization is conducted in an inert gas, at a temperature between $+100°$ and $-120°$ C., preferably between $+20°$ and $-100°$ C.

The following are some examples of polymerizable compounds of general Formula 1, which may be employed: methyl-, ethyl-, propyl-, isopropyl-, butyl-, isobutyl-, secondary butyl-, tertiary butyl-, amyl-, isoamyl-, neopentyl-, lauryl-, ketyl-, cyclo-, hexyl- and benzyl- esters of the following butadiene-1-carboxyl acids; 1-carboxy-butadiene ($\beta$-vinyl acrylic acid or pentadienoic acid), 4-methyl-1-carboxy-butadiene (or sorbic acid), 4-isopropyl-1-carboxy-butadiene, 4-cyclohexyl-1-carboxy-butadiene, 4-phenyl-1-carboxy-butadiene ($\beta$-styrylacrylic acid), 4-tolyl-1-carboxy-butadiene.

The polymers obtained under the above mentioned polymerization conditions are high molecular weight linear polymers, having intrinsic viscosities which may exceed (when determined in tetrahydronaphthalene at 130° C. or in $CHCl_3$ at 30° C.) 1 or 2 units (100 cm.$^3$/g.).

These polymers possess a 1,4-enchainment and show under the infrared examination essentially a trans-structure for the remaining double bond. Under the X-ray examination, these polymers all exhibit a high crystallinity. This demonstrates the presence of a high degree of steric regularity which is not limited to the double bond configuration. Therefore, there must be present a regular steric configuration for each of the two asymmetric C-atoms present in the chain of every monomeric unit, or for the single asymmetric carbon atom, when $R^I$ is H.

It is important to note that the polymer contains carbon atoms which are typically asymmetric, the asymmetry of which results from the different groups immediately adjacent to this carbon atom. This asymmetry is present also in the chains which may be considered as having an unlimited length. The asymmetry is thus different from that occurring in isotactic poly-alpha olefin macromolecules and cannot be attributed, as is the case in alpha-olefins, to the different length and/or to the configuration of the two segments of the chain bound to the asymmetric atom.

The polymers obtained according to the present invention possess two or three stereoisomeric centers (depending on whether $R^I$ is equal to or different from hydrogen) and the highest steric regularity is obtained only in the case where all these centers are each in the same steric configuration in successive monomeric units at least for long segments of the polymer chain.

An examination under X-rays carried out on different polymers obtained according to the present invention which are obtained from esters of the sorbic acid, shows the presence of an identity period of about 4.8 A., which corresponds to that of 1,4-trans polybutadiene. This examination establishes that the steric regularity of the asymmetric carbon atoms is of the isotactic type, for if a steric regularity of the syndiotactic type were present an identity period at least double to that found for the monomeric unit would be found.

In addition, examination of the polymer of the methyl ester of the 4-phenyl-1-carboxy butadiene (β-styrylacrylic acid) shows the presence of a high crystallinity. In this case both side groups of the asymmetric carbon atoms are remarkably large, and the crystallinity demonstrates that both asymmetric carbon atoms have a stereoregular structure. Therefore, these polymers are the first known case of tri-tactic polymers. Upon applying to them the nomenclature proposed for di-isotactic polymers, these polymers may be termed erithro-, or threo-di-iso-trans tactic polymers.

A study of the crystalline structure of the polybutyl sorbate demonstrates that this polymer has an erithro-di-iso-trans-tactic structure.

In cases where $R^I$ is H, the polymers are only ditactic polymers, more exactly, iso-trans-tactic polymers.

This new class of polymers comprises a very high number of polymers which differ from each other due to the different nature of their substituents.

The polymers of the present invention differ also in their physical properties; having for example different melting points and different solubilities. Analogous to what was observed for the polyolefins, an increase of the molecular weight of the substitutent does not always cause an increase in the melting point and a decrease in solubility.

In fact, in cases where substituents $R^{II}$ have a linear chain, an increase in the molecular weight of the substituent causes a decrease in the melting temperature due to the mobility of the chain substituent which therefore acts as a plasticizer chemically bound to the macromolecule.

The polymers of the present invention, which have a higher degree of crystallinity may be separated from those having a lower crystallinity, molecular weight and a stereoblock structure by a solvent extraction.

The polymers obtained from the monomers of general Formula 1 characteristically contain two reactive functional groups, the esterified carboxyl group and the double unsaturated bond, and therefore are able to react at both above mentioned groups.

These polymers act per se as thermoplastic polymers capable of being molded several times (the melting process being reversible) and extruded into fibers orientable by stretching. The polymers can be worked with the methods normally used with thermonplastic polymers.

The fibers of the ploymers, obtained according to the present invention, show interesting characteristics. Of particular interest are the fibers obtained from polymethyl sorbate (which after the spinning and stretching show an ultimate tensile strength of 4–4.5 g./den. and a breaking elongation of 10–15%), from polybutylsorbate and from poly-methylpentadienate (β-vinylacrylate). These fibers are elastic and after having been stretched up to 700%, they still possess a high elongation reversibility.

It is possible, however, when employing initiators of the free radical type, either alone or in the presence of other monomers, to obtain a linking due to the polymerization or copolymerization in the double bond with the resulting formation of insoluble and thermosetting polyesters.

Another cross-linking method may be achieved by acting on the carboxyl group by the addition of polyfunctional alcohols or of the corresponding oxides (such as, for example, ethyleneglycol, ethylene oxide, etc.) preferably, in the presence of transesterification catalysts.

The presence of the carboxyl groups gives to the polymers adhesive properties and this makes possible their use, either alone or in other mixtures, in the manufacture of paints. In addition, these polar groups improve the affinity of the polymer for the colorants.

The polyesters of the present invention either in a thermoplastic or cross-linked condition may be saponified to polyacids in an alkaline medium.

The polyacids derived from non-cross-linked polyesters are easily saponified; for instance they dissolve in alkaline solutions and shown a remarkable surface active capacity; while the polyacids derived from cross-linked polyesters may be used as cationic ion-exchanger resins.

In the attached drawings, the X-ray spectra (CuKα) of powders are given (measured by means of a Geiger counter). The relative intensities are indicated on the ordinates, while the angle 2θ is shown on the abscissas.

The following examples are given in order to illustrate and not to limit the scope of the present invention.

*Example 1*

9.6 g. methylsorbate (trans-trans-4-methyl-1-carbomethoxy-butadiene), purified by distillation on BaO and 40 ml. anhydrous toluene are introduced under nitrogen into a dried test tube.

After cooling at −70° C., 2 ml. of a solution of butyl lithium in pentane (6 millimoles) are introduced by means of a pipette. The polymerization is carried out for 16 hours at −40° C. and then the mixture so obtained is coagulated with methanol.

The product is washed with methanol and dried.

Figure 1:
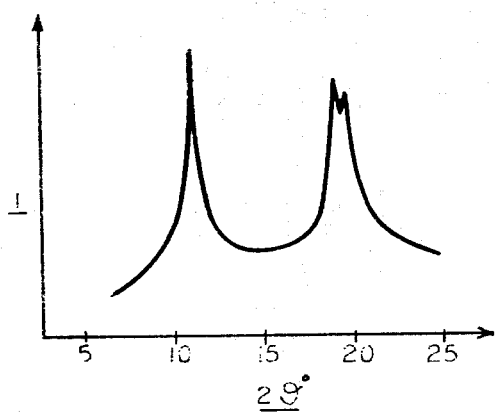
FIG. 1 shows the X-ray spectra for polymethylsorbate made as described in Example 1 hereinafter.

The polymer so obtained (8.1 g.) is crystalline under the X-ray examination (FIG. 1). The intrinsic viscosity in tetrahydronaphthalene at 135° C. is 0.5×100 cm.³/g.; and the melting point determined by means of a polarizing microscope is 210° C.

By carrying out, on the product an extraction with boiling solvents in Kumagawa extractors, the following fractions are obtained:

7% acetone extract (crystalline) melting point=155° C. [η]=0.15
2% ether extract (crystalline)
0% heptane extract.

The residual high crystalline polymer is swollen and is partially dissolved by benzene and by carbon tetrachloride, while it is completely soluble in chloroform.

Example 2

Figure 2:
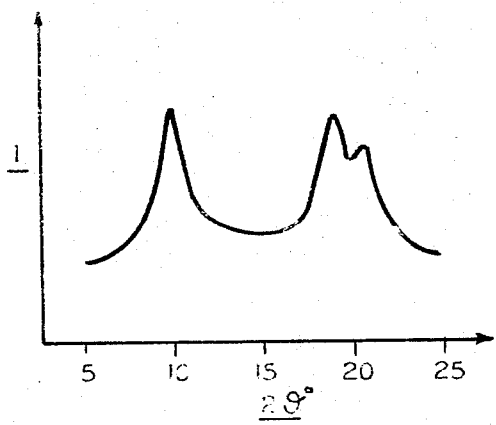
FIG. 2 shows the X-ray spectra for polyethylsorbate made as described in Example 2 hereinafter.

By polymerizing according to the method described in Example 1, but using 4.75 g. ethyl sorbate in 20 ml. toluene and 6.6 millimoles butyl lithium, at a temperature of −40° C., after 12 hours, 3.3 g. crystalline polymer (FIG. 2) having [η]=0.22 and melting point 172° C., are obtained.

Example 3

Figure 3:
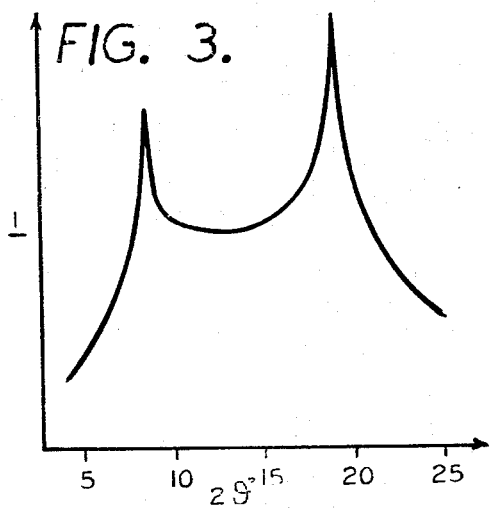
FIG. 3 shows the X-ray spectra for polyisopropylsorbate made as described in Example 3 hereinafter.

By polymerizing according to the method described in Example 1, but using 3.8 g. isopropyl sorbate in 20 ml. anhydrous toluene and 5 millimoles butyl lithium, at −70° C., 0.46 g. crystalline polymer (FIG. 3) having [η]=1.15 are obtained after 12 hours.

Example 4

Figure 4:
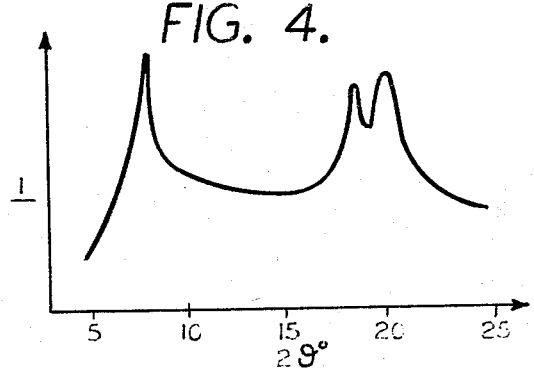
FIG. 4 shows the X-ray spectra for polybutylsorbate made as described in Example 4 hereinafter.

By polymerizing according to the method described in Example 1, but using 5.2 g. butyl sorbate in 30 ml. toluene, 6 millimoles butyl lithium, at a temperature of −70° C., 3.6 g. crystalline polymer (FIG. 4) soluble in $CCl_4$ are obtained after 12 hours.

Example 5

Figure 5:
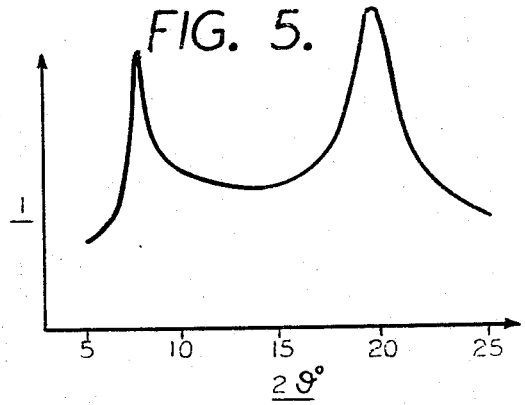
FIG. 5 shows the X-ray spectra for polyisobutylsorbate made as described in Example 5 hereinafter.

By polymerizing according to the method described in Example 1, but using 4.8 g. isobutyl sorbate in 20 ml. toluene, 6.6 millimoles butyl lithium at a temperature of −40° C., 2.4 g. crystalline polymer (FIG. 5) having [η]=0.80 are obtained after 12 hours.

Example 6

By polymerizing according to the method described in Example 1, but using 3 g. lauryl sorbate, 5 millimoles butyl lithium and 5 ml. toluene, for 1 hour at −50° C., 0.9 g. of crystalline polymer are obtained.

Example 7

Figure 6:
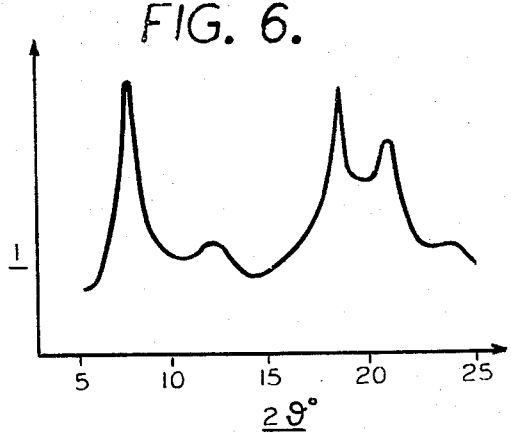
FIG. 6 shows the X-ray spectra for polymethyl-β-styryl acrylate made as described in Example 7 hereinafter.

By polymerizing according to the method described in Example 1, but using 2 g. methyl-β-styryl acrylate (4-phenyl-1-carboxy-methoxy-butadiene), which is crystallized from n-heptane, in 30 ml. toluene, and in the presence of 10 millimoles butyl lithium at a temperature of −40° C., 0.21 g. crystalline polymer (FIG. 6) having a melting point higher than 230° C. are obtained after 12 hours.

Example 8

By polymerizing according to the method described in Example 1, but using 22.6 g. ethyl-β-styryl acrylate in 80 ml. toluene and 10 moles butyl lithium at a temperature of −40° C., 16 g. crystalline polymer are obtained after 20 hours.

Example 9

By polymerizing according to the method described in Example 1, but using 9.5 butyl-β-styryl acrylate 60 ml. toluene and 6 moles butyl lithium at a temperature of −40° C., 6.2 g. crystalline polymer, having a melting point at about 180° C. are obtained after 14 hours.

Example 10

0.2 ml. tetahydrofurane and 1.5 moles butyl lithium in toluene are introduced under nitrogen in a dried test tube. After cooling to −60° C., a solution of 1.9 g. methyl pentadienoate in toluene (total toluene 15 ml.) are added. After 15 minutes of polymerization the polymer is coagulated by introduction of methanol. Yield =1.4 g. melting point=about 110° C.

An oriented fiber of the polymer thus obtained is crystalline under X-ray examination. A non-stretched plate has an ultimate tensile strength of 100 kg./cm.² and a breaking elongation of 750%.

Example 11

By polymerizing according to the method described in Example 1, but using 4.8 g. butyl sorbate, 20 ml. anhydrous n-heptane, 5 millimoles butyl lithium at a temperature of −70° C. 2.16 g. crystalline polymer [η]=0.56 which under X-ray examination is shown to be identical to the polymer of the Example 4 are obtained, after 12 hours.

Example 12

By polymerizing for 12 hours according to the method described in Example 1, but using 4.8 g. butyl sorbate, 20 ml. anhydrous diethylene glycol diethyl ether, 13 millimoles butyl lithium at a temperature of −60° C., 0.5 g. polymer, which under X-ray examination, is shown to be identical to that obtained in Example 4, are obtained.

Example 13

By polymerizing for 12 hours according to the method described in Example 1, but using 3.8 g. butyl sorbate, 20 ml. anhydrous diethyl ether, 6.6 millimole butyl lithium at a temperature of −60° C., 2.5 g. polymer are obtained. This polymer under X-ray examination is identical to that obtained in Example 4.

Example 14

0.5 g. fluorene are introduced under nitrogen in a dry test tube and are reacted at room temperature for 3 hours with a toluene solution containing 3 millimoles butyl lithium.

After cooling at −50° C., 3.9 methylsorbate are added to the fluorenyl lithium thus obtained. After 16 hours of polymerization, 2.7 g. crystalline polymer are obtained.

Example 15

2.9 butyl sorbate are added, at −40° C., to a toluene suspension of lithium dimethylamide (4-millimoles) which has been obtained by reacting butyl lithium with diethyl amine (3 hours at 60–80° C.). After 14 hours of polymerization, 1.4 g. polymer are obtained.

Example 16

2.9 g. methyl sorbate in 15 cc. toluene are added under nitrogen at −46° C. to a solution of 2 moles of ketyl lithium (obtained from lithium and benzofenone in tetrahydrofurane). After 24 hours of polymerization, 0.07 g. polymer is obtained.

Example 17

2.9 g. butyl sorbate are added at −50° C. to 5 ml. of an heptane suspension containing 3.5 millimoles octyl sodium. After 14 hours of polymerization 0.05 g. polymer are coagulated.

Example 18

By polymerizing according to the method described in Example 10, but using 0.2 ml. tetrahydrofurane, 1.3 millimoles butyl lithium, 16 cm.³ anhydrous toluene, and 2.9 g. butyl sorbate, after polymerization for 15 minutes at −45° C., 0.45 g. crystalline polymer are obtained.

Example 19

By polymerizing according to the method described in Example 10, but using 0.33 ml. anisole, 1.5 millimoles butyl lithium, 2.9 g. methyl sorbate and 15 ml. toluene and carrying out the mixing of the reagents at −50° C., 0.45 g. crystalline polymer are obtained after 16 hours polymerization at −40° C.

Example 20

By polymerizing as described in the preceding example, but at a temperature between −60° C. and −40° C. and using 0.16 ml. pyridine, 2 millimoles butyl lithium, 2.9 g. methyl sorbate, 15 ml. toluene, 0.5 g. polymer are obtained after 16 hours.

Example 21

By polymerizing according to a method described in example 19, but using 0.4 ml. tributyl amine, 2 millimoles butyl lithium, 2.9 g. methyl sorbate and 15 ml. toluene, after 16 hours at a temperature between −60 and −40° C., 1.15 g. polymer are obtained.

Example 22

By working as in Example 19, but using 0.25 ml. dimethyl aniline, 2 millimoles butyl lithium, 2.9 g. methyl sorbate, 15 ml. toluene, after 16 hours of polymerization at −60+−40° C., 0.5 g. polymer are obtained.

Example 23

By polymerizing as described in Example 19, but in the presence of 0.52 g triphenyl phosphine, 2 millimoles butyl lithium, 15 ml. toluene and 2.85 g butyl sorbate, after 16 hours at −50° C, 2.0 g. polymer are obtained.

Example 24

0.72 g. of tetrabutyl ammonium iodide are reacted under nitrogen at room temperature with 4 millimoles of butyl lithium in 20 ml. of toluene. Two separate liquid layers are thus formed. After cooling the mixture so obtained to −40° C., 2.8 g. of butyl sorbate are introduced. After 16 hours of polymerization, 2.05 g. of crystalline polymer are obtained.

The polymerization is promoted also by each of the two above mentioned liquid layers.

Example 25

2 g. crystalline polybutylsorbate are dissolved in 60 ml. acetone. A solution consisting of 4 g. KOH in 10 ml. ethyl alcohol is then added in a dropwise manner. After a short time, a powder consisting of the sodium salt of the sorbic acid polymer is precipitated.

The poly-salt is soluble in water and the polyacid may be separated from the aqueous solution by acidification with hydrochloric acid. The poly-acid is soluble in aqueous alkaline solutions, in methanol and acetone, but is only slightly soluble in water and benzene.

The infra-red spectrum of the benzene insoluble product indicates the presence of an unsaturated polyacid having a trans configuration of the double bond.

Having thus described the invention, what we desire to secure and claim by Letters Patent is:

1. A high molecular weight linear crystalline polymer of a monomeric compound containing at least two conjugated double bonds and having the formula $$R^I\text{---}CH\text{=}CH\text{---}CH\text{=}CH\text{---}COOR^{II} \quad (1)$$

wherein $R^I$ and $R^{II}$ are each selected from the group consisting of H, alkyl, cycloalkyl, aryl and aralkyl groups, said polymer being crystalline and exhibiting a highly regular structure, said structure being iso-trans-tactic when $R^I$ is hydrogen, said structure being erithro-di-iso-trans-tactic when $R^I$ is other than hydrogen.

2. Polymers according to claim 1 containing a 1,4-enchainment in the main chain and asymmetric carbon atoms possessing a sterically regular configuration.

3. Polymers according to claim 2 containing unsaturated bonds of the trans type in the main chain.

4. The crystalline polymer of claim 1 wherein $R^I$ is methyl and $R^{II}$ is methyl.

5. The crystalline polymer of claim 1 wherein $R^I$ is methyl and $R^{II}$ is ethyl.

6. The crystalline polymer of claim 1 wherein $R^I$ is methyl and $R^{II}$ is isopropyl.

7. The crystalline polymer of claim 1 wherein $R^I$ is methyl and $R^{II}$ is butyl.

8. The crystalline polymer of claim 1 wherein $R^I$ is methyl and $R^{II}$ is isobutyl.

9. The crystalline polymer of claim 1 wherein $R^I$ is methyl and $R^{II}$ is dodecyl.

10. The crystalline polymer of claim 1 wherein $R^I$ is phenyl and $R^{II}$ is methyl.

11. The crystalline polymer of claim 1 wherein $R^I$ is phenyl and $R^{II}$ is ethyl.

12. The crystalline polymer of claim 1 wherein $R^I$ is phenyl and $R^{II}$ is butyl.

13. A crystallizable polymer of the methyl ester of β-vinyl acrylate having a highly regular structure.

14. The crystalline polymer of claim 1 wherein $R^I$ is methyl and $R^{II}$ is hydrogen.

15. Polymers of metal salts of sorbic acid having a highly regular structure.

16. The process for producing high molecular weight linear crystalline polymers having a highly regular structure which comprises polymerizing a monomeric compound of the formula $$R^I\text{---}CH\text{=}CH\text{---}CH\text{=}CH\text{---}COOR^{II}$$

wherein $R^I$ and $R^{II}$ are each selected from the group consisting of H, alkyl, aryl and aralkyl groups, in the presence of an anhydrous solvent and a catalyst containing a member selected from the group consisting of lithium alkyls, lithium fluorenyl, lithium ketyl, lithium dimethylformamide and sodium alkyls.

17. The process according to claim 16 wherein said polymerization is carried out at a temperature of from about −120° C. to 100° C.

18. The process according to claim 17, wherein the polymerization is carried out at a temperature of from about −100° C. to 20° C.

19. The process according to claim 16, wherein butyl lithium is employed.

20. The process according to claim 16, wherein lithium fluorenyl is employed.

21. The process according to claim 16, wherein lithium dimethylformamide is employed.

22. The process according to claim 16, wherein a lithium ketyl is employed.

23. The process according to claim 16, wherein a sodium alkyl is employed.

24. The process according to claim 16, wherein a sodium octyl is employed.

25. The process according to claim 16, wherein said polymerization is carried out in the presence of a solvent selected from the group consisting of aliphatic hydrocarbons, aromatic hydrocarbons, nitrogen-containing Lewis organic bases, oxygen-containing Lewis organic bases, tertiary phosphines and mixtures thereof.

26. The process according to claim 25, wherein the solvent is toluene.

27. The process according to claim 25, wherein the solvent is heptane.

28. The process according to claim 16, wherein the polymerization is carried out in the presence of an anhydrous hydrocarbon solvent and of tetrabutyl ammonium iodide.

29. Fibers obtained from the polymers of claim 1.

30. Fibers containing the crystalline polymer of claim 4.

31. Fibers containing the crystaline polymer of claim 7.

32. Fibers containing the poly-methyl-β-vinyl acrylate of claim 13.

References Cited by the Examiner

UNITED STATES PATENTS

| | | | |
|---|---|---|---|
| 2,841,574 | 7/1958 | Foster | 260—89.3 |
| 2,881,156 | 4/1959 | Pilar et al. | 260 |
| 3,098,060 | 7/1963 | Miller | 260—88.7 |

OTHER REFERENCES

Farmer et al.: J. Chem. Soc. (1940), pages 1339–46.
Fox et al.: J.A.C.S., vol. 80, (1958) pages 1768–9.
Williams et al, J. Am. Chem. Soc., vol. 79 (1957), page 1716.

JOSEPH L. SCHOFER, *Primary Examiner.*

PHILLIP E. MANGAN, JOSEPH R. LIBERMAN, DONALD E. CZAJA, *Examiners.*

H. WONG, *Assistant Examiner.*